Aug. 27, 1963 W. R. CHANCE 3,101,489
PLASTIC BOAT CONSTRUCTION
Filed Feb. 17, 1959 7 Sheets-Sheet 5
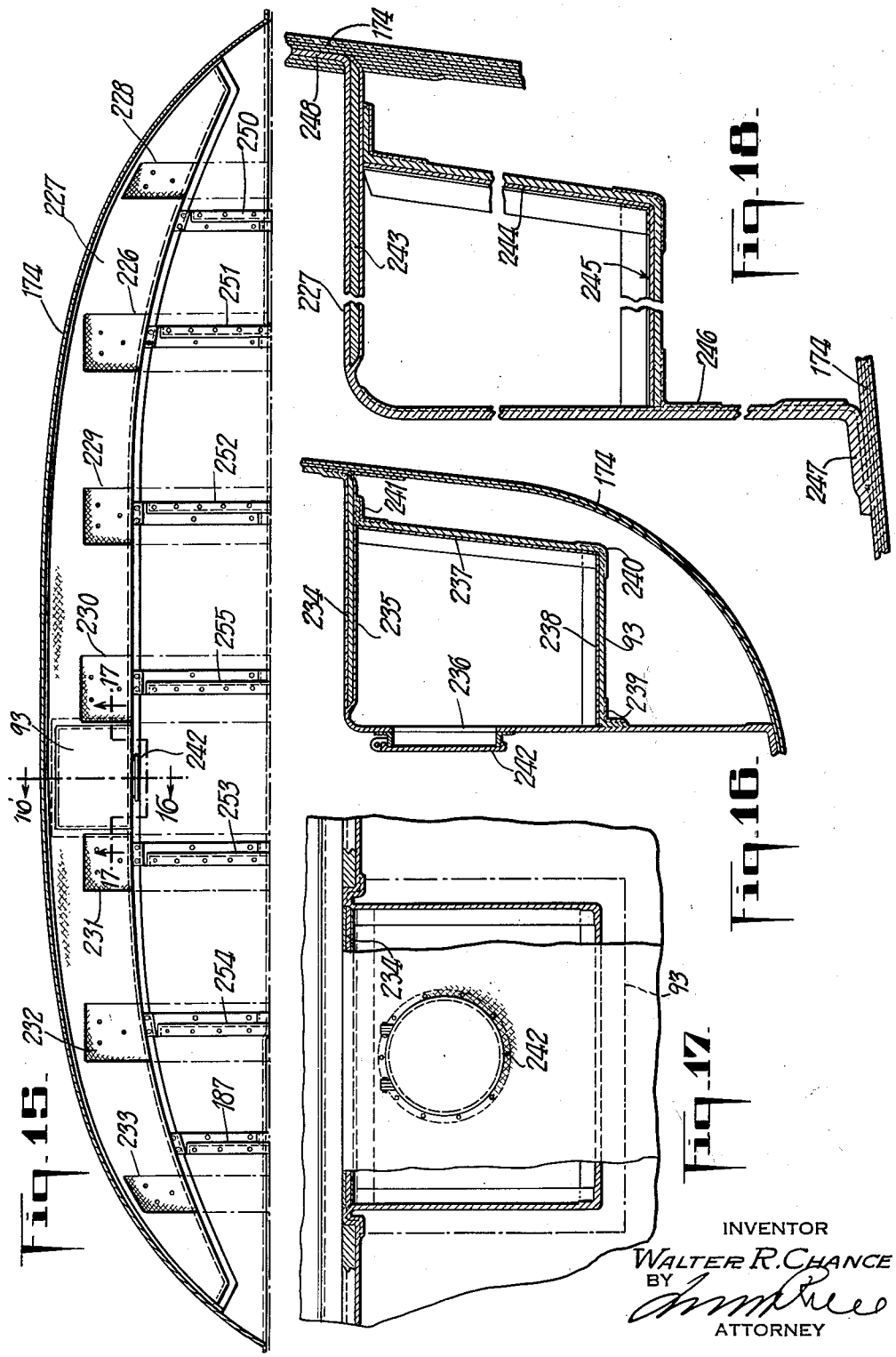
INVENTOR
WALTER R. CHANCE
BY
ATTORNEY

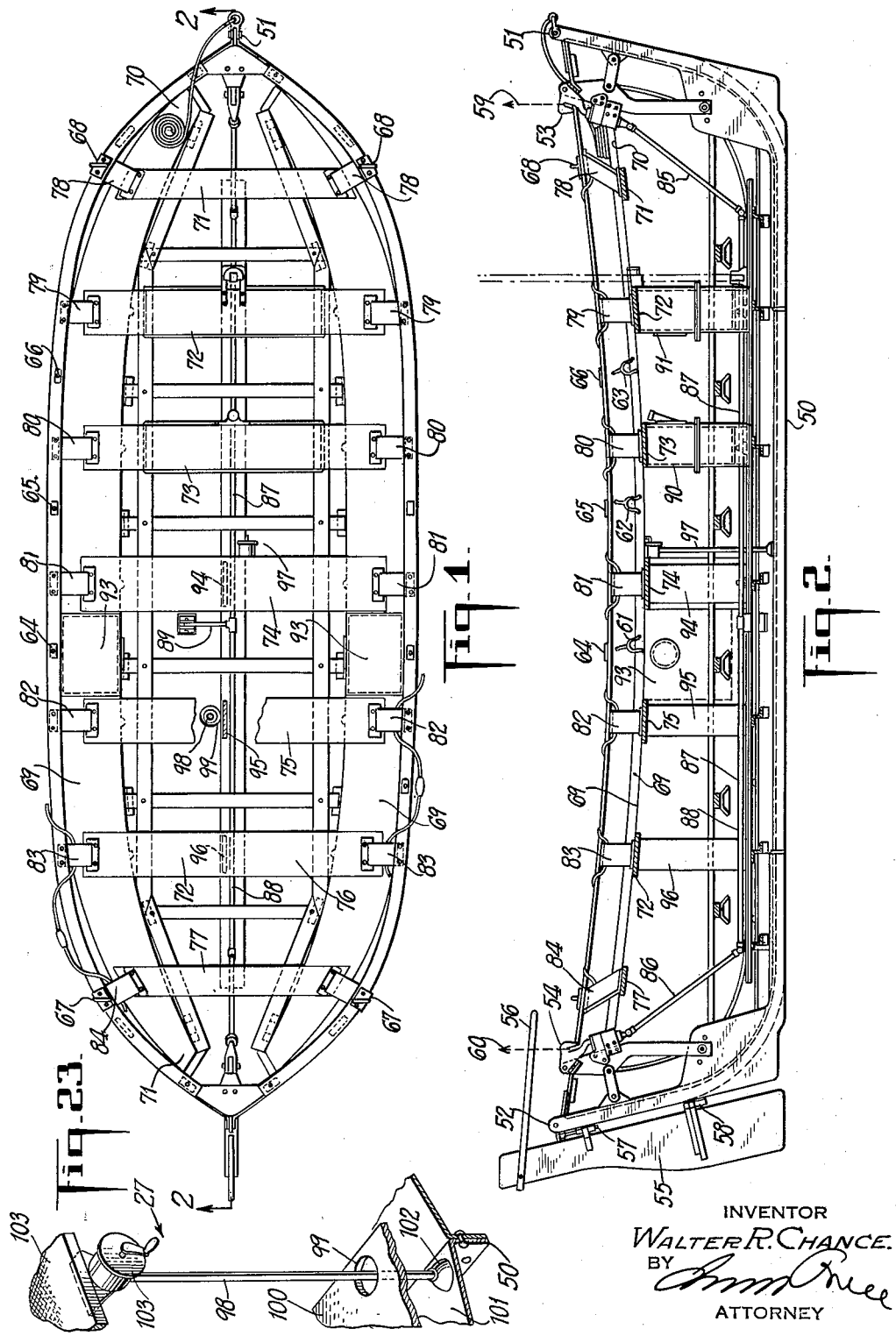

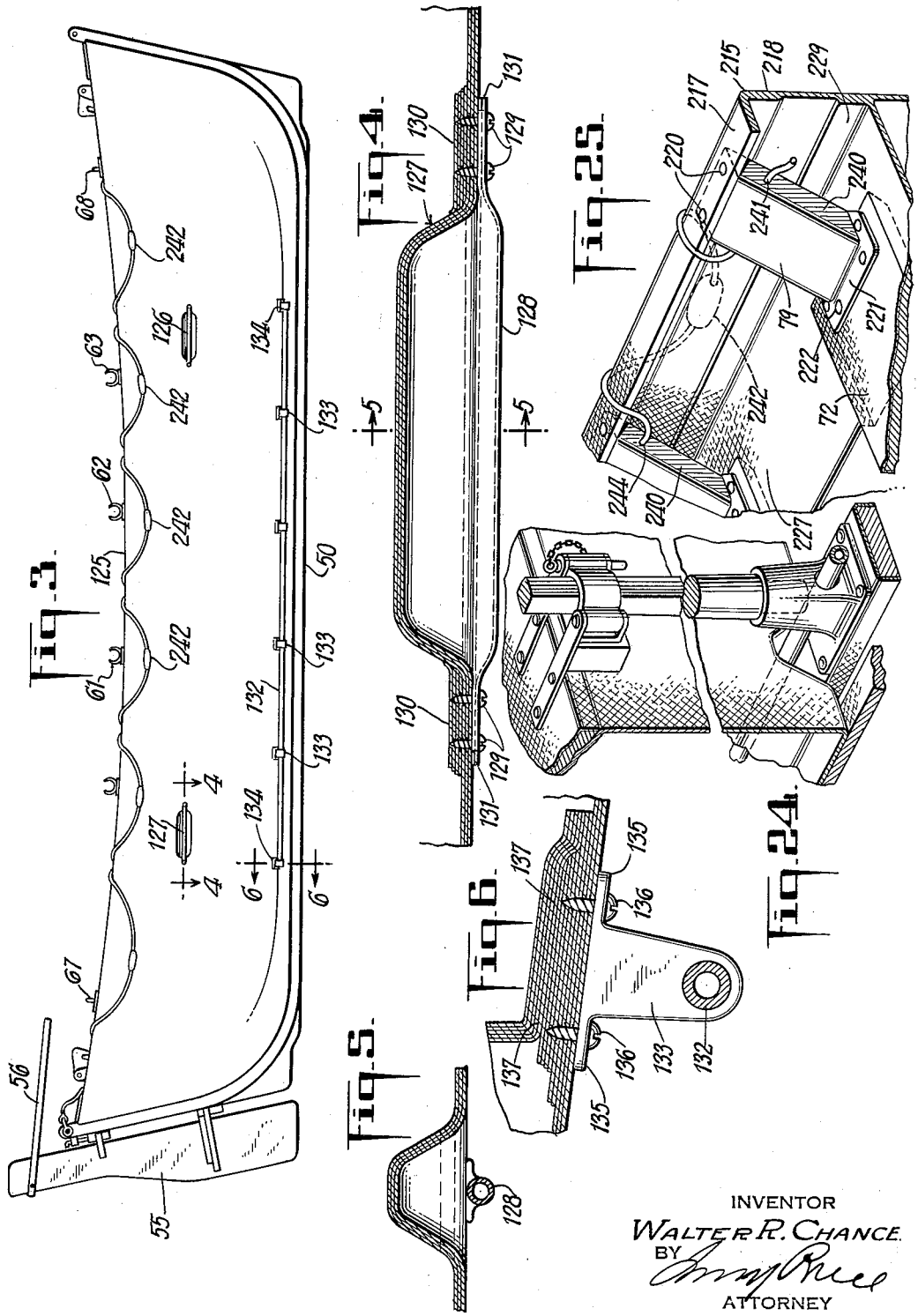

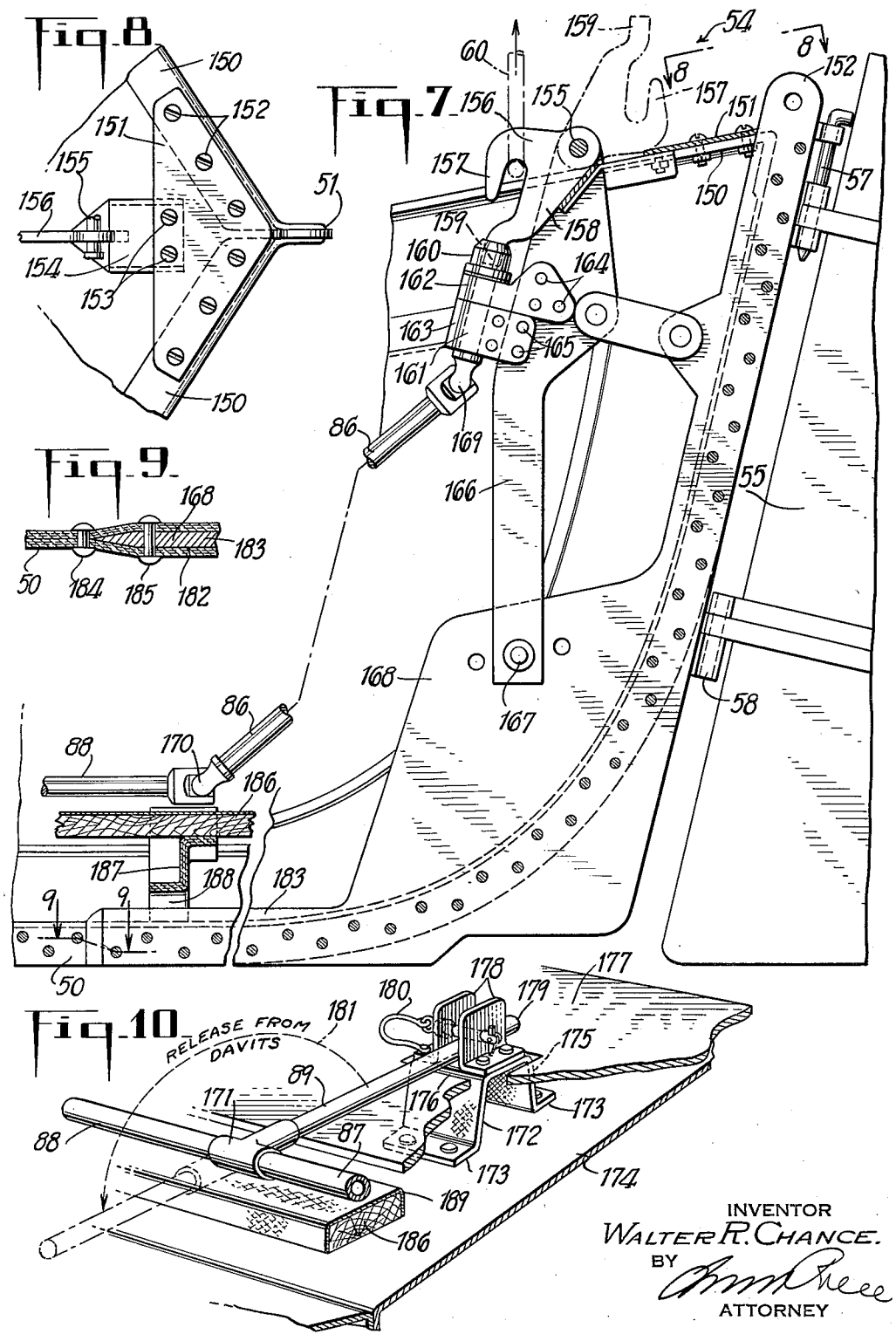

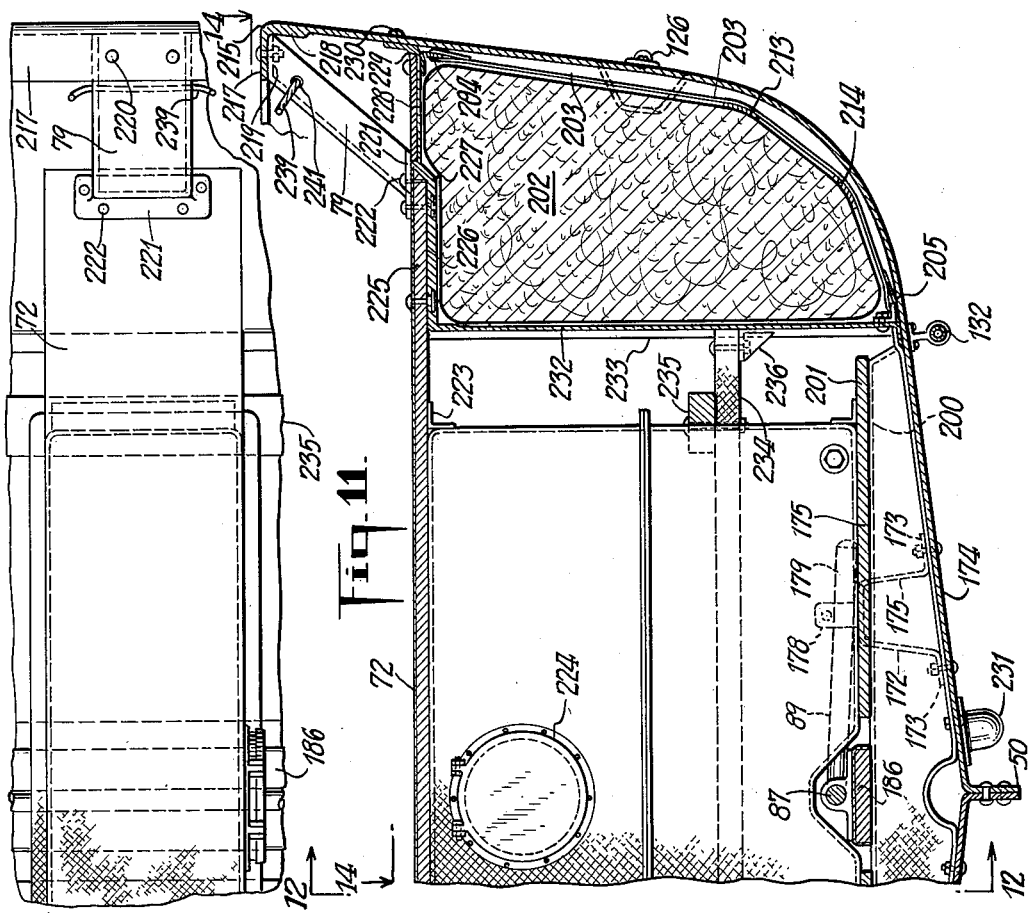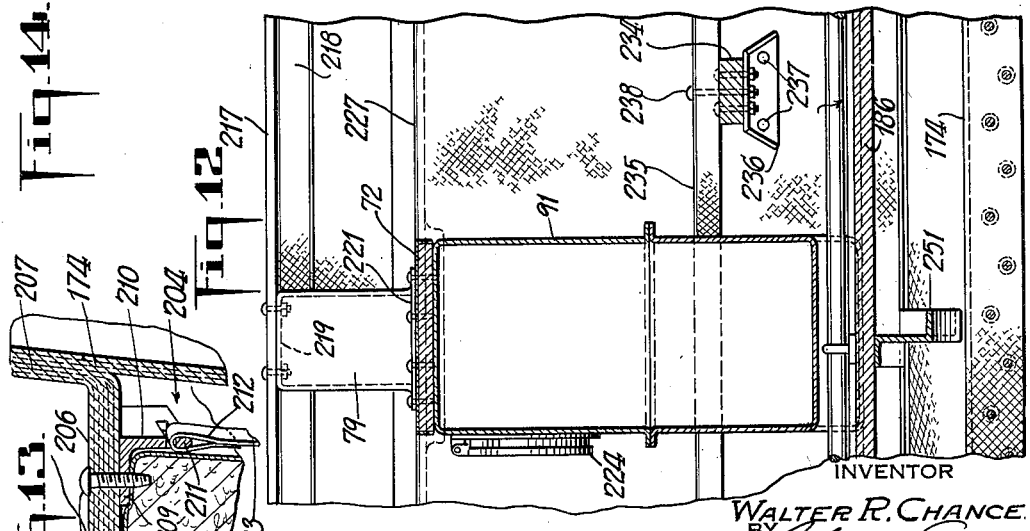

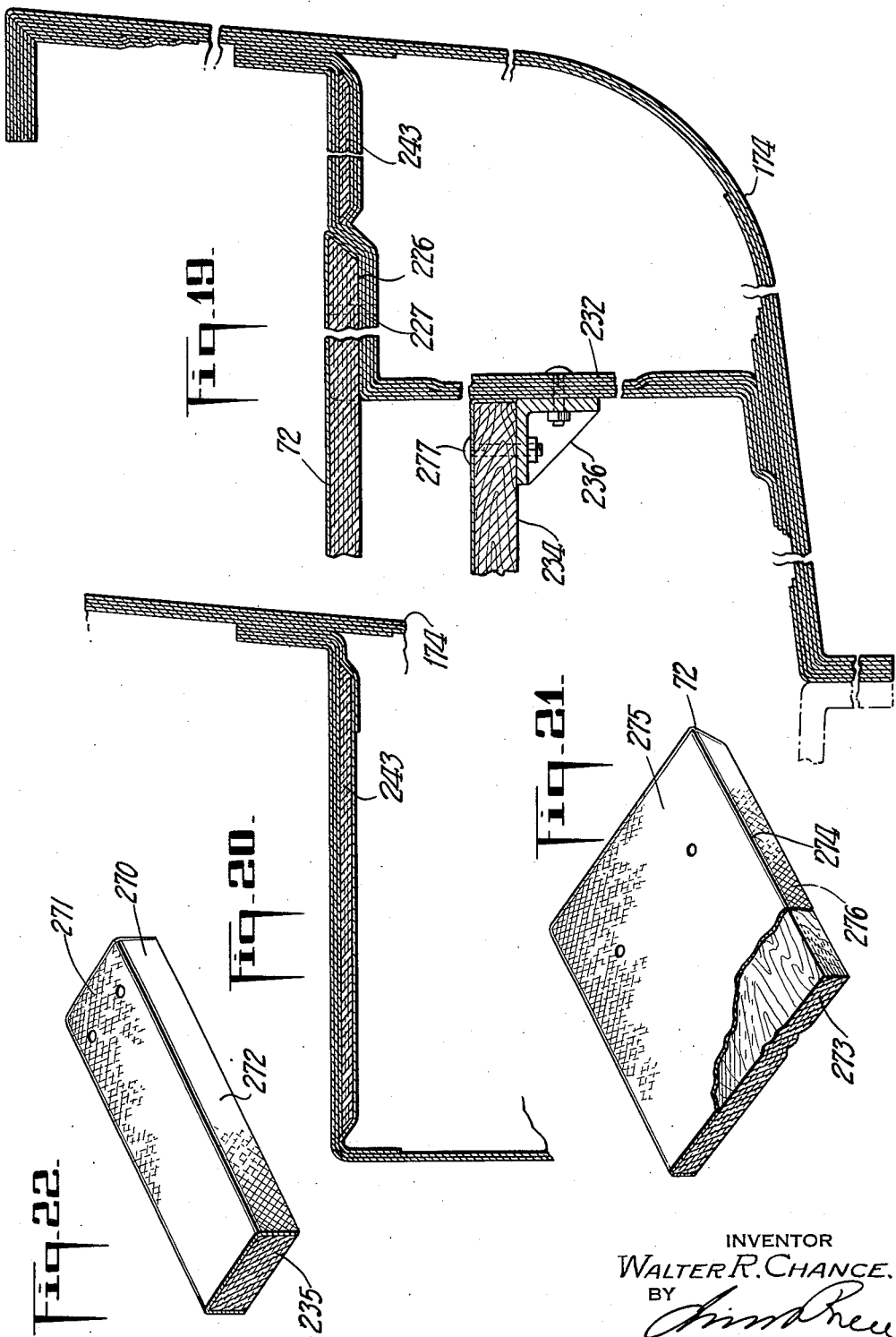

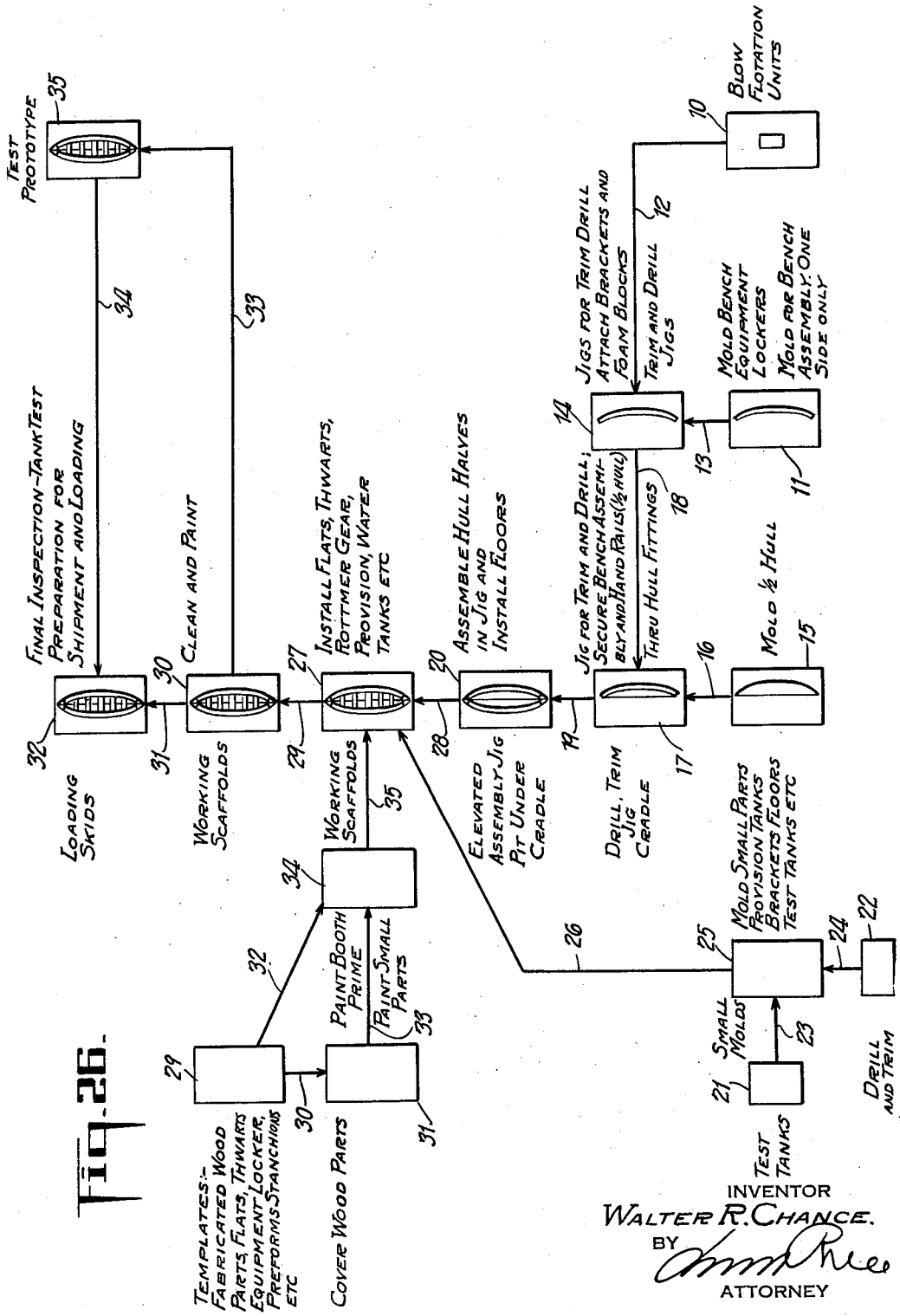

United States Patent Office  3,101,489
Patented Aug. 27, 1963

3,101,489
PLASTIC BOAT CONSTRUCTION
Walter R. Chance, Falls Church, Va., assignor to Continental Copper & Steel Industries, Inc. (Welin Davit and Boat Division), New York, N.Y., a corporation of Delaware
Filed Feb. 17, 1959, Ser. No. 793,721
16 Claims. (Cl. 9—3)

The present invention relates to a plastic boat construction and it particularly relates to a plastic boat construction in which the boat is formed of resin impregnated glass fiber materials.

It is among the objects of the present invention to provide a novel plastic lifeboat construction which may be readily manufacture at low cost and which will be of such strength and durability as to be readily suspended from its end portions by means of the usual lifeboat release gear with assurance that the boat may be given the usual rough handling both during launching and during recovery, to which a lifeboat is normally subjected without any structural strain or difficulty.

Another object is to provide a novel plastic lifeboat construction which may be readily shaped and formed without excessive manual labor and which will be of light weight yet durable, and in which the various metal parts will be suitably integrated with the plastic shell construction, and which boat may be readily formed and completely manufactured in an assembly line operation at relatively low cost and in a relatively short time.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to first mold half sections, which half sections are then drilled and assembled with the hand rails and side elements, with both hull halves then being assembled in a jig and with the floors installed.

After the assembly of the hull halves, preferably in a jig, and the installation of the floors, the thwarts, suspension and release gear, and provision and water tanks are assembled, following which the entire structure is cleaned and painted.

Desirably, the actual hull structure consists of a plurality of layers of woven fiber glass which have been successively coated or impregnated with polyester resins which are applied, layer on layer, until a suitable hull thickness is achieved.

Desirably, one layer of loosely woven glass fiber fabric is first applied to a suitable half hull formed or shaped, followed by applying with spray or brush the liquid polyester solution, with layer after layer applied as each successive layer partly solidifies, until the wall thickness builds up to the desired extent.

Desirably, the warp of the glass fiber should extend longitudinally from bow to stern, with the weft or filling extending from the thwarts to the keel, and this relationship should be maintained in both molded or hull halves.

Before each successive layer of woven glass fiber is applied, the prior layer should have been thoroughly impregnated and saturated with the liquid resinous material.

Following such saturation, the new layer of woven glass fiber cloth may be applied to the still soft adhesive prior coating on the previously laid down glass fiber material.

This process is continued until the final thickness is achieved.

For extra strength, the middle layers or central layers of woven glass fiber material may be of greater thickness and have a heavier warp and filling by 50% to 100% than the outer layers, which should desirably be of a finer warp and filling.

It is also possible to introduce woven metallic cloth adjacent or along the inner and outer faces of the hull for extra protection and rigidity. Where it is desirable to give a firm anchorage to members at the thwarts or keel, or bow or stern, perforated or mesh metal flanges may be inserted or imbedded between the successive layers of woven glass fibers, as they are assembled in layer after layer to form the necessary lifeboat or hull thickness.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top plan view showing the general arrangement and construction of an oar propelled plastic lifeboat.

FIG. 2 is a profile view showing the skeleton structure of such lifeboat, taken upon the line 2—2 of FIG. 1.

FIG. 3 is a side elevational view of the plastic boat, upon a reduced scale as compared to FIGS. 1 and 2, showing the hand hold constructions and the thwart and keel constructions.

FIG. 4 is a transverse horizontal selectional view taken upon the line 4—4 of FIG. 3 and upon an enlarged scale as compared to FIG. 3, showing the hand rail hull construction.

FIG. 5 is a transverse sectional view taken upon the line 5—5 of FIG. 4, showing the hand rail construction.

FIG. 6 is a transverse sectional view upon an enlarged scale, showing the grab rail construction.

FIG. 7 is a fragmentary side sectional view showing the release gear construction at one end of the boat.

FIG. 8 is a fragmentary transverse elevational view showing the breastplate construction, taken upon the line 8—8 of FIG. 7.

FIG. 9 is a transverse sectional view of the keel construction adjacent the front end of the boat, taken upon the line 9—9 of FIG. 7 and upon an enlarged scale as compared to FIG. 7.

FIG. 10 is a fragmentary perspective view showing the central actuating equipment for the release gear, positioned midway of the boat.

FIG. 11 is a fragmentary transverse vertical sectional view through the side of the completed boat structure, showing the buoyancy material, provisional tanks and floor construction.

FIG. 12 is a side elevational view showing in profile from the interior of the boat the thwarts, bench assembly and provision tanks and associated construction.

FIG. 13 is a detailed transverse sectional view showing the securing band clip.

FIG. 14 is a fragmentary top plan view, taken on the line 14—14 of FIG. 11, showing the top of the boat construction.

FIG. 15 is a top plan view of the bench assembly of one half of the boat construction.

FIG. 16 is a transverse sectional view taken upon the line 16—16 of FIG. 15, showing the watertight equipment tank construction.

FIG. 17 is an offset transverse sectional view taken upon the line 17—17 of FIG. 15, showing the inside front view of the equipment tank.

FIG. 18 is a transverse sectional view showing the seat construction and bench assembly.

FIG. 19 is a transverse sectional view of the side of the boat showing a typical hull section.

FIG. 20 is a transverse sectional view showing a typical bench section.

FIG. 21 is a fragmentary perspective view shown in partial section, a typical thwart construction.

FIG. 22 is a fragmentary perspective view showing a typical wood foot rest construction.

FIG. 23 is a fragmentary perspective view showing a typical bilge pump installation.

FIG. 24 is a fragmentary perspective view showing an intermediate post construction with the release gear actuating mechanism extending therethrough.

FIG. 25 is a fragmentary top perspective view showing a typical upper gunwales construction.

FIG. 26 is a diagrammatic lay-out illustrating the various steps in the assembly line production of the plastic lifeboats, according to the present invention.

Referring to FIG. 26, the floatation units are formed at position 10.

These floatation units may be formed by blowing resin impregnated material to suitable shape inside of the form so that they will be substantially airtight, four of which are provided for a 24 foot lifeboat. At position 11 the bench assemblies for each side may be formed or molded from the layers of glass cloth and impregnating resin, and there may thus be produced the bench equipment lockers for each side of the boat.

The units from positions 10 and 11 then are moved together, as indicated by the flow lines 12 and 13 to position 14, where the equipment lockers and the floatation units are trimmed, drilled and provided with suitable brackets.

Meanwhile the boat hull itself has been molded in half hull sections at position 15 by successive layers of woven glass fiber material being impregnated with sprayed, brushed or poured resin solution.

This half boat section then is passed, as indicated at 16, to position 17, where it is assembled as indicated by the line 18 with the bench assembly, the hand rails and the hull fittings so that each half of the molded boat contains these structures.

The half boat assembly then passes, as indicated by the flow line 19, to position 20, where the two hull halves are assembled in a jig and the floor is installed, this being desirably done in the cradle so that the hull is accessible along the keel as well as in the interior thereof.

Meanwhile at position 21 the test tanks are formed and at position 22 their small parts, including position tanks, brackets, floor elements, test tanks and the like are properly drilled, shaped and jigged.

These small parts from positions 21 and 22 pass, as indicated by the flow lines 23 and 24, to the assembly position 25, from whence they pass, as indicated by the line 26, to position 27. Into position 27 is moved the assembled hull halves from position 20 by the flow line 28.

While this is going on, at position 29 there are fabricated the various wood parts, flats, thwarts, equipment lockers, preforms, stanchions, etc. Where wood parts are to be covered by the woven glass fiber resin impregnated material, the flow is indicated by the flow line 30 to position 31, where the various parts constructed at position 29 and position 30 pass according to the flow lines 32 and 33 to the preassembly position 34.

The preassembly position 34 may provide for painting the small backs and aiding any primer coatings thereto as are necessary. These various small parts then pass, as indicated by the flow lines 35, to position 27, where the boat may be positioned on a working scaffold.

At position 27 the flats, thwarts, Rottmer gear provision and water tanks are assembled. Then the assembly passes, as indicated by the flow line 29, to position 30, where it is cleaned and painted upon a working scaffold.

Finally, the boat passes at the flow line 31 to position 32, where it is positioned upon loading skids for final inspection, tank test and preparation for shipment and loading.

If desired, between position 30 and position 32, the boat may be passed, as indicated by the flow lines 33 and 34, through position 35, where it will be given a test which would be upon a prototype only.

Returning to the assembly boat structure as shown in FIGS. 1 and 2, the keel 50 extends from the bow 51 to the stern 52 and the keel desirably consists of a heavy metal strip, or a series of strips, upon which the two boat halves are assembled or bolted. At each end are positioned the Rottmer release gear 53 and 54. At the stern is positioned the rudder 55 with the tiller 56 and the hinge arrangement 57 and 58.

The Rottmer gear permits suspension of the boat, as indicated by the falls 59 and 60 which extend up to suitable davits.

Along the sides of the boat are positioned the oar locks 61, 62 and 63, the oar lock sockets 64, 65 and 66, and the grip pads 67 and 68. The benches 69 extend along the sides of the boat from position 70 at the bow to 71 at the stern and there are a series of thwarts extending transversely, as indicated at 71, 72, 73, 74, 75, 76 and 77, which are held in position by means of the thwart brackets 78, 79, 80, 81, 82, 83 and 84.

The Rottmer gear is operated by means of the tubing connections 85 and 86 extending obliquely downwardly at the ends of the boat and extending longitudinally to the central position of the boat, as indicated at 87 and 88 to the actuating handle 89.

There are water tanks positioned at 90 and provision tanks at 91. (See FIG. 2).

There are equipment tanks at 93 which may have access openings on the inside of the boat structure.

Extending along the length of the boat there may be the thwart stanchions 94, 95 and 96 and a bilge pump may be positioned at 97.

The bilge pump is shown in somewhat larger detail in FIG. 23 and it has a tubular member 98 which extends downwardly through the opening 99 in the floor 100 to the space 101 where there is an inlet connection 102.

The tubing 98 extends upwardly to the manually operated pump member 103, supported upon the bracket 104 by means of which any water in the lower hull of the boat may be drawn out and discharged over the side.

Referring to the side elevation of the boat, the oar locks 61, 62 and 63 are shown in position in the oar lock sockets with the grip pads 67 and 68 extending above the top of the gunwales 125.

The sides of the boat are provided with the hand rails 126 and 127, which hand rails 126 and 127 include a longitudinally extending bar 128, the ends of which are held in position by the screws or bolts 129 in the laminated structure 130.

These screws and bolts extend through the enlarged ends 131 of the hand rails. Along the lower side of the hull there are also positioned the grab rails 132, which are held in position by the intermediate and end supports 133 and 134.

These intermediate supports are provided with outwardly extending flanges 135 which are held in position by means of the screws or bolts 136 which project into the laminated structure 137, as shown best in FIG. 6.

Referring to the Rottmer release gear, there is shown the upper stern keel construction 52 toward which the forward converging gunwales 150 extend, as indicated in FIG. 8, where they are joined by means of the triangular breastplate 151.

The triangular breastplate is bolted or screwed at 152 to the top flange of the gunwale structure 150 and the central part of the breastplate is screwed or welded, as indicated at 153 (see FIG. 8) to the plate 154, which has a pivot connection at 155 to the hook member 156, forming part of the Rottmer gear 54.

The Rottmer gear 54 has a forwardly and downwardly extending nose 157 and a rear triangular body portion 158 which terminates in the tail 159, which is normally held in the release socket 160.

When the socket 160 is turned to release the tail 159, the hook may be turned into the dotted line position, as indicated at the upper right of FIG. 7, whereupon the boat will be released from the falls which are indicated at 60. These falls will extend up to the davit, not shown.

The release cup 160 is actuated by means of the shaft 161, which extends through the contacting bearing guide members 163, which are mounted by the bolts 164 and 165 upon the stern stanchion 166.

The stern stanchion extends from the top plate 154, as shown in FIG. 8, where it is connected at 167 to the central plate member 168, which in turn is connected to the keel 50.

The shaft 161 is turned by means of the universal drive connection 169 by the pipe 86 which extends down to the universal connection 170.

From the universal connection at 170 the pipe connection extends as indicated at 88 to the actuator 89, which is held in position by means of the T coupling 171.

The T coupling 171 connects the handle or actuator 89 to the forwardly and rearwardly extending tubing members 87 and 88.

The handle is normally held in position on the inverted U-shaped bracket 172, having the flanges 173 which are mounted on the hull portion 174. (See FIG. 10). The side legs 175 project upwardly through the opening 176 in the flat portion 177 to receive the angle brackets 178.

These angle brackets receive the removable pin 179 held in position by the chain or wire 180. Upon removal of the pin 179 the handle 89 may be thrown from solid line position to dotted line position, as indicated by the semicircular arrow 181, to release the cup 160 and permit the hooks 157 to swing into inverted position, as indicated in dotted line position in FIG. 7.

FIG. 9 shows the two keel plates at 50, which are spaced apart, as indicated at 182, to hold the lower end 183 of the keel plate 168, which is fixed in position by means of the rivets or pins 184 and 185.

Mounted upon the junction of the keel plate, as shown in FIG. 9, is the center plank 186 over which the universal connection 170 is positioned. This center plank 186 is mounted on the angle brackets 187, which in turn are mounted at 188 on each side of the keel structure.

The center plank 186, as shown in FIG. 10, may extend longitudinally and it may be covered by the inverted U cross section layers 189 of polyester resin impregnated glass fabrics.

Referring to FIG. 11, there is shown a cross section of the side of the boat with the keel at 50 and the hull at 174 carrying the inverted U-shaped bracket held in position by means of the flanges 173.

The center plank 186 is positioned upon the bottom plate 200, which carries the phenolic faced plywood flat 201. At the side of the boat is positioned the buoyancy material 202 which is held in position by means of a strap 203 extending from the upper band clip 204 down to the lower band clip 205.

In FIG. 13 is shown the connection 204 in greater detail. The hull extends upwardly, as indicated at 174, to the gunwale and there is positioned a bench assembly 206 consisting of ply glass fabric impregnated with polyester resin.

The multiple ply material is of reduced thickness, as indicated at 207, on its vertical side where it is attached to the upwardly extending hull 174. The soft tapping screw or bolt 208 extends through the material 206 into the flange 209 to the angle clip 210.

The angle clip 210 has a downwardly extending leg 211 which receives a loop 212 from which extends downwardly the strap 203.

This strap 203 does not contact the buoyancy block 202 but extends over the protective chafing pads 213 and 214 to a similar connection 205 at the lower inside end of the buoyancy material 202.

Referring again to FIG. 11, the hull extends upwardly to the gunwale at 215, as shown in FIG. 11, where it is made of extra thickness for strength purposes and has the inwardly and downwardly directed thwart brackets 79. As shown in FIG. 25, the gunwale has a horizontal flange 217 of extra thickness layers of glass fibers impregnated with polyester resin and the upper vertical portion 218 is also of extra thickness material.

The oblique downwardly extending flange thwart brackets are held in position at their top flanges 219 (see FIGS. 11, 12 and 25) by the bolts or screws 220.

The lower ends of the thwart brackets 79 have the outwardly extending horizontal flanges 221 which are mounted by the bolts or screws 222 upon the cross bench of thwart 72.

Directly under the thwart 72 is the provision tank 91 for provision storage, which is held in position by means of the angle brackets 223.

The provision tank has a watertight access opening 224 and its sides are formed by 1,000 count multiple ply resin impregnated cloth.

The ends 225 of the thwarts fit in a recess 226 in the plastic bench 227 (see FIG. 11). The bench has an extension 228 which terminates in the angle member 229 held in position by the head bolt 230. (See FIG. 11.)

At the outside of the hull is shown the hand grip 126 previously described in connection with FIGS. 3, 4 and 5 and the grab rail 132, previously described in connection with FIG. 6.

Along side of the keel 50 is the drain opening 231.

Extending downwardly from the bench 227 are the vertical members 232 (see FIG. 11) which have stiffeners 233 positioned thereon. The stiffeners 233 extend the full height of the inside face of the buoyancy material.

Extending transversely across the interior of the boat are the stretchers 234 which carry the foot rests 235. These foot rests are mounted upon the plates or side walls 232 by means of the stretcher brackets 236. These stretcher brackets are bolted to the wall 232 by the bolts 237 and have the vertical bolts 238 extending through the stretcher 234 as well as the longitudinal foot rest 235.

As indicated best in FIG. 25, the gunwale rope 239 extends through the openings 241 in the side flanges 240 and carries the intermediate floats 242.

Now referring to FIGS. 15 to 18, the side benches 227 are shown along the hull 174, of double arcuate shape, with the thwart recesses 226, 228, 229, 230, 231, 232 and 233 formed therein. FIG. 16 shows a section taken through the equipment locker 93 which is positioned about midway of the boat.

This equipment locker is formed directly under the seat portion 234 and inside of the hull 174 and consists of a plurality of plies of 100 count cloth forming the inside faces 235, 236, 237 and 238 thereof. The corners at 239, 240 and 241 may be made of extra thickness for strength.

Desirably, three or four plies of wire cloth material impregnated with resin have been found to be sufficient.

As shown in the partial sectional view of FIG. 17, the waterproof swinging door 242 is mounted upon the front 236 of the equipment locker 93.

The connection to the hull is shown in greater detail in FIG. 18 and there may be positioned a plywood core 243 along the length of the boat forming the bench section 227. There may also be provided Masonite panels 244 and 245.

The inside wall 246 is joined to the bottom of the hull 174 at 247 and to the side of the hull at 248.

Many layers of cloth, wire screen or other sheet material impregnated one upon the other may be utilized to give sufficient strength and rigidity.

Extending across the boat from side to side will be the reinforcing Z members 187, 250, 251, 252, 253, 254 and 255, which are positioned directly above the lower part of the boat structure and which are shown in section in the lower part of FIG. 12 and also at the lower part of FIG. 7.

Referring to FIGS. 19 to 22, there are shown typical sections illustrating the assembly of the plies of material.

FIG. 19 shows a thwart 72 fitting in a recess 226 formed by a plurality of layers of impregnated glass fiber cloth, as indicated at 227. The reinforcement Masonite or plywood board 243 may extend the full length of the side of the boat.

The bench on each side of the recess 226 may receive a full width of the plywood insert 243.

As indicated in FIG. 22, the foot rest 235 may consist of a wooden board covered by one ply of 100 count cloth 270 covering the top 271 and the sides 272 thereof.

The thwarts 72, as shown in FIG. 21, may also be made of plywood, as indicated at 273, covered by one ply 1,000 count resin impregnated cloth 274 covering the top 275 and the sides 276 thereof.

The stretcher brackets 236 may be made of metal and they are mounted by the bolts 277 on the stretchers 234 and the side walls 232. The stretchers 234 may be formed in the same manner as the foot rest 235 of FIG. 22 and the thwart 72 of FIG. 21.

It is thus apparent that the applicant has provided a complete system for forming the hull, provision and water tanks, bench assembly, thwart brackets, stretcher brackets, Z floor sections, release handle structure, and other parts of resin impregnated plastic.

The overlapping portions my be integrally joined together by pressure while still wet before the resin hardens with the various long sections being reinforced by Masonite panels or plywood panels.

Desirably, all joints are formed of the glass fabric, with preferably a two inch overlap and with all corners having a one-half inch radius.

The outer facings should desirably be of 1,000 count impregnated cloth, and waterproof facing may be applied to all of the corners.

The Z floors will extend from side to side of the wall, desirably below the center plank and a plywood flat above the keel. The plywood flats may be mounted directly upon the transverse Z members.

The construction as shown in the present application is an oar propelled plastic lifeboat, but it is to be understood that motor driven lifeboats may also be constructed in the same manner and the hull has sufficient strength to withstand considerable buffeting, repeated suspension, lowering and raising from the usual lifeboat davit structures.

As many changes could be made in the above plastic boat construction, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. An all plastic lifeboat construction, said construction consisting of integrally joined laminated resin covered multiple sheets, and said construction having side hull sections independently molded of a plurality of independent glass fiber woven resin impregnated sheets and joined together at the boat keel said side sections being provided with elongated multiple ply plastic impregnated benches and thwarts extending transversely across and between upper parts of the side hull sections of the hull integrally joined to the upper parts and said multiple sheets forming the hull having substantially integral and transversely extending portions forming the walls of interior tank constructions and said benches.

2. An all plastic lifeboat construction, said construction consisting of integrally joined laminated resin covered multiple sheets, and said construction having side hull sections independently molded of a plurality of independent glass fiber woven resin impregnated sheets and joined together at the boat keel said side sections being provided with elongated multiple ply plastic impregnated benches and thwarts extending transversely across and between upper parts of the side hull sections of the hull integrally joined to the upper parts said benches being reinforced by insertions of plywood panels between the plastic impregnated plies and said multiple sheets forming the hull having substantially integral and transversely extending portions forming the walls of interior tank constructions and said benches.

3. An all plastic lifeboat construction, said construction consisting of integrally joined laminated resin covered multiple sheets, and said construction having side hull sections independently molded of a plurality of independent glass fiber woven resin impregnated sheets and joined together at the boat keel said side sections being provided with elongated multiple ply plastic impregnated benches and thwarts extending transversely across and between upper parts of the side hull sections of the hull integrally joined to the upper parts, said benches being recessed at spaced intervals and thwarts covered by resin impregnated sheeting being positioned in such recesses and said multiple sheets forming the hull having substantially integral and transversely extending portions forming the walls of interior tank constructions and said benches.

4. An all plastic lifeboat construction, said construction consisting of integrally joined laminated resin covered multiple sheets, and said construction having side hull sections independently molded of a plurality of independent glass fiber woven resin impregnated sheets and joined together at the boat keel said side sections being provided with elongated multiple ply plastic impregnated benches and thwarts extending transversely across and between upper parts of the side hull sections of the hull integrally joined to the upper parts, said boat having equipment, food storage and other necessary tanks positioned under the thwarts and benches and also formed of multiple ply resin impregnated material and said multiple sheets forming the hull having substantially integral and transversely extending portions forming the walls of interior tank constructions and said benches.

5. An all plastic lifeboat construction, said construction consisting of integrally joined laminated resin covered multiple sheets, and said construction having side hull sections independently molded of a plurality of independent glass fiber woven resin impregnated sheets and joined together at the boat keel said side sections being provided with elongated multiple ply plastic impregnated benches and thwarts extending transversely across and between upper parts of the side hull sections of the hull integrally joined to the upper parts, each side of said boat under the elongated benches being provided with flotation blocks held in position by straps pressing on said blocks by means of anti-chafe pads and said multiple sheets forming the hull having substantially integral and transversely extending portions forming the walls of interior tank constructions and said benches.

6. An all plastic lifeboat construction the hull of said construction being formed of two longitudinal side hull sections joined together along the keel of the boat and having side hull sections independently molded of a plurality of independent glass fiber woven resin impregnated sheets and joined together at the boat keel said side sections being provided with elongated multiple ply plastic impregnated benches and thwarts extending transversely across and between upper parts of the side hull sections of the hull integrally joined to the upper parts, and a plurality of spaced, transversely extending Z reinforcement members extending from the hull up to the lower portion of the boat between the lower sides of the hull and serving as a means for attachment of the flooring and said multiple sheets forming the hull having substantially integral and transversely extending portions forming the walls of interior tank constructions and said benches.

7. A plastic lifeboat composed of a multi-layer laminated boat hull construction each layer consisting of woven fiber glass coated and impregnated with polyester resin and a number of layers forming the necessary wall and structural thickness throughout, said boat hull being formed of two longitudinal half hull sections joined together with and including floors, thwarts and provision and water and air tanks also formed of said laminated construction, the warp of the glass fiber extending longitudinally from bow to stem with the weft extending transversely from thwarts to the keel, the laminations forming the sides and tops of the air tanks also extending into and forming the inside laminations of the interior of the plastic lifeboat with said inside laminations extending the full length of the plastic lifeboat, said air tanks have vertical risers and horizontal top sides and said top sides being recessed at intervals to receive said thwarts.

8. The boat of claim 7, the middle and central layers of woven glass fiber material being of greater thickness and having a heavier warp and weft by 50 to 100% than the outer layers and the outer layers having a finer warp and weft.

9. The boat of claim 7, woven metallic cloth being positioned along the inner and outer faces of the laminated construction.

10. The boat of claim 7, said air tanks being substantially completely filled by a substantially solid block of buoyancy material held in position therein and straps extending along the interior of the hull to hold said block of buoyancy material closed against the horizontal and vertical interior faces of the air tanks.

11. The boat of claim 7, certain of the layers forming an integral part of the laminated hull structure and also extending transversely, inwardly and upwardly from the hull section to join with and form part of the interior air tank and seat structures.

12. The boat of claim 7, the horizontal and inside vertical walls of the air tanks being formed by extending certain of the laminations from the hull transversely, and inwardly from the hull section to that the walls of the air tank are an integral part of the hull structure.

13. The boat of claim 7, the keel of the boat being formed by outwardly turned parallel abutting multi-laminated structures substantially integrally joined together.

14. A multiple layer laminated sheet integral plastic boat construction having side hull portions and interior air tanks each formed of superimposed resinous layers, and said laminated sheet having central laminations which extend integrally into the center of the side hull portions and also extend inwardly transversely away from the side hull portions so that the central laminations of the hull and tanks will be the same.

15. A laminated polyester resin impregnated glass woven fiber integral plastic lifeboat construction composed of two separate half outer hull sections joined together and an integral stepped inner air tank construction with vertical risers and horizontal top elements all formed of a plurality of layers of woven fiber glass formed of a succession of layers of woven fiber glass impregnated with polyester resins with the laminations forming and extending through the risers and top elements also extending into and forming an intermediate part of the interior face of the outer hulls and extending along the interior of hull section longitudinally from end to end, said top elements being recessed at intervals and thwarts received and mounted in said recesses.

16. The lifeboat of claim 15, woven metallic cloth being laminated along the inner and outer faces of the hull and the interior laminations being of greater thickness and having a heavier warp and filling by 50 to 100% more than the outer layers.

References Cited in the file of this patent

UNITED STATES PATENTS

| | | |
|---|---|---|
| 2,341,010 | Baier | Feb. 8, 1944 |
| 2,478,042 | Elling | Aug. 2, 1949 |
| 2,562,372 | Tveter | July 31, 1951 |
| 2,721,341 | Roberts | Oct. 25, 1955 |
| 2,743,465 | Vogel | May 1, 1956 |
| 2,813,050 | Hickson | Nov. 12, 1957 |
| 2,831,793 | Elmendorf | Apr. 22, 1958 |
| 2,866,985 | Blackmore | Jan. 6, 1959 |
| 2,919,451 | Long | Jan. 5, 1960 |
| 2,950,701 | Stefani | Aug. 30, 1960 |

FOREIGN PATENTS

| | | |
|---|---|---|
| 22,612 | Great Britain | 1913 |
| 756,239 | Great Britain | Sept. 5, 1956 |
| 787,260 | Great Britain | Dec. 4, 1957 |

OTHER REFERENCES

Plastics Engineering, September 1949.
"Boats," volume 51, No. 1, of January 1954, pages 61–62.